United States Patent [19]
Cobbley et al.

[11] Patent Number: 5,818,510
[45] Date of Patent: *Oct. 6, 1998

[54] METHOD AND APPARATUS FOR PROVIDING BROADCAST INFORMATION WITH INDEXING

[75] Inventors: David A. Cobbley, Portland; John A. Throckmorton, Lake Oswego, both of Oreg.

[73] Assignee: Intel Corporation, Santa Clara, Calif.

[ * ] Notice: The term of this patent shall not extend beyond the expiration date of Pat. No. 5,614,940.

[21] Appl. No.: 669,723

[22] Filed: Jun. 27, 1996

Related U.S. Application Data

[63] Continuation of Ser. No. 327,504, Oct. 21, 1994.
[51] Int. Cl.$^6$ ................................................. H04N 7/10
[52] U.S. Cl. ................................ 348/7; 455/4.2
[58] Field of Search ........................ 348/7, 10, 13, 348/12; 455/2, 4.1, 4.2, 5.1; 711/117–123, 125, 126

[56] References Cited

U.S. PATENT DOCUMENTS

| | | |
|---|---|---|
| 4,052,719 | 10/1977 | Hutt et al. . |
| 4,161,728 | 7/1979 | Insam . |
| 4,288,809 | 9/1981 | Yabe . |
| 4,344,090 | 8/1982 | Belisomi et al. . |
| 4,695,880 | 9/1987 | Johnson et al. . |
| 4,751,578 | 6/1988 | Reiter et al. . |
| 4,894,789 | 1/1990 | Yee . |
| 5,010,499 | 4/1991 | Yee . |
| 5,121,476 | 6/1992 | Yee . |
| 5,541,638 | 7/1996 | Story ........................................... 348/7 |
| 5,563,648 | 10/1996 | Menand et al. ............................ 348/7 |
| 5,572,442 | 11/1996 | Schulhof et al. .......................... 348/7 |
| 5,616,876 | 4/1997 | Cluts ........................................ 84/609 |

*Primary Examiner*—Victor R. Kostak
*Attorney, Agent, or Firm*—Blakely, Sokoloff, Taylor & Zafman

[57] ABSTRACT

A method and apparatus generates and transfers a stream of broadcast information which includes multiple video and audio information segments to a receiving device. Once received, the segments are stored in a cache and indexing information associated with the segments is made available to end users of the apparatus. The end users are then able to select which segment(s) they would like to receive, and the selected segment(s) is transmitted to the requesting user(s). In one embodiment, when a new segment is received, a determination is made as to whether it is a more recent version of another segment already stored by the apparatus. If it is a more recent version, then the older version is overwritten by the newer version.

46 Claims, 5 Drawing Sheets

METHOD AND APPARATUS FOR PROVIDING BROADCAST INFORMATION WITH INDEXING

This is a continuation of application Ser. No. 08/327,504, filed Oct. 21, 1994.

BACKGROUND OF THE INVENTION

FIELD OF THE INVENTION

The present invention pertains to computer systems and receiving broadcast information. More particularly, this invention relates to caching video and audio information and providing the cached information to end users in an indexed manner.

BACKGROUND

Video and audio broadcasts currently have a wide and varied audience. Such broadcasts encompass a wide spectrum of information, including news broadcasts, weather reports, soap operas, etc. This broadcast information is typically made available to individual end users at a particular time, and users simply choose whether they will watch the broadcast at that time. Alternatively, an individual user may have a video cassette recorder (VCR) which enables the user to record the broadcast in an analog format and play it back at a later time.

One disadvantage to current video and audio broadcasts is that the end users are limited to either watching the information as it is received, or viewing it as recorded on a VCR. These methods force the end users to consume the information sequentially in the order it is received. For example, during a news broadcast, important headlines may be broadcast first and a weather report may be broadcast sometime later. Therefore, in order to watch the weather report, it is necessary for the end user to sit through the intervening news. Thus, it would be beneficial to provide a system which allows individual users to watch only those portions of the broadcast which are of interest to them without requiring them to watch the entire broadcast. The present invention provides such a system.

In addition, the advancement of computer technology has resulted in computer systems being found on the desktops of a large number of individuals in the work force. These individuals are often interested in staying knowledgeable of current events, whether it be for personal or business reasons. These individuals, however, are particularly time-sensitive during the work day; that is, an individual at work typically cannot take a few half-hour breaks during the day to watch live news reports. Thus, it would be advantageous to provide a system which allows an end user to view up-to-date news reports of interest to him or her when it is convenient for him or her. The present invention provides such a system.

Additionally, storing audio and video information requires a substantial amount of storage space in a computer system. Therefore, it is difficult to store multiple news reports in a computer system until such a time as the user is able to search through them for the desired information. Furthermore, locating a desired portion of audio and/or video information may be very difficult, such as requiring sequentially scanning hours worth of a VCR videotape or other storage medium. Thus, it would be beneficial to provide a system which stores broadcast information in an efficient manner, keeping only that portion of the information which is most current. In addition, it would be beneficial to provide a system which allows an individual to quickly and easily access the stored information.

The present invention provides for these and other advantageous results.

SUMMARY OF THE INVENTION

A method and apparatus for providing broadcast information with indexing is described herein. A stream of broadcast information including multiple video and audio information segments is generated and transferred to a receiving device. Once received, the segments are stored in a cache and indexing information associated with the segments is made available to end users of the apparatus. The end users are then able to select which segment(s) they would like to receive, and the selected segment(s) is transmitted to the requesting user(s).

In one embodiment, when a new segment is received, a determination is made as to whether it is a more recent version of another segment already stored by the apparatus. If it is a more recent version, then the older version is overwritten by the newer version.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following detailed description numerous specific details are set forth in order to provide a thorough understanding of the present invention. However, it will be understood by those skilled in the art that the present invention may be practiced without these specific details. In other instances well known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention provides a system for individual users to access the most recent version of multiple versions of broadcast information in an indexed manner. Broadcast information refers to any type of audio data and/or video image data which can be transmitted from a source unit to a destination unit via any of a wide variety of communication media, such as a television program broadcast. The descriptions below discuss this broadcast information as news information, however it will be appreciated that the present invention is not limited to a specific type of information. Any type of broadcast information can be utilized by the present invention.

Figure 1:
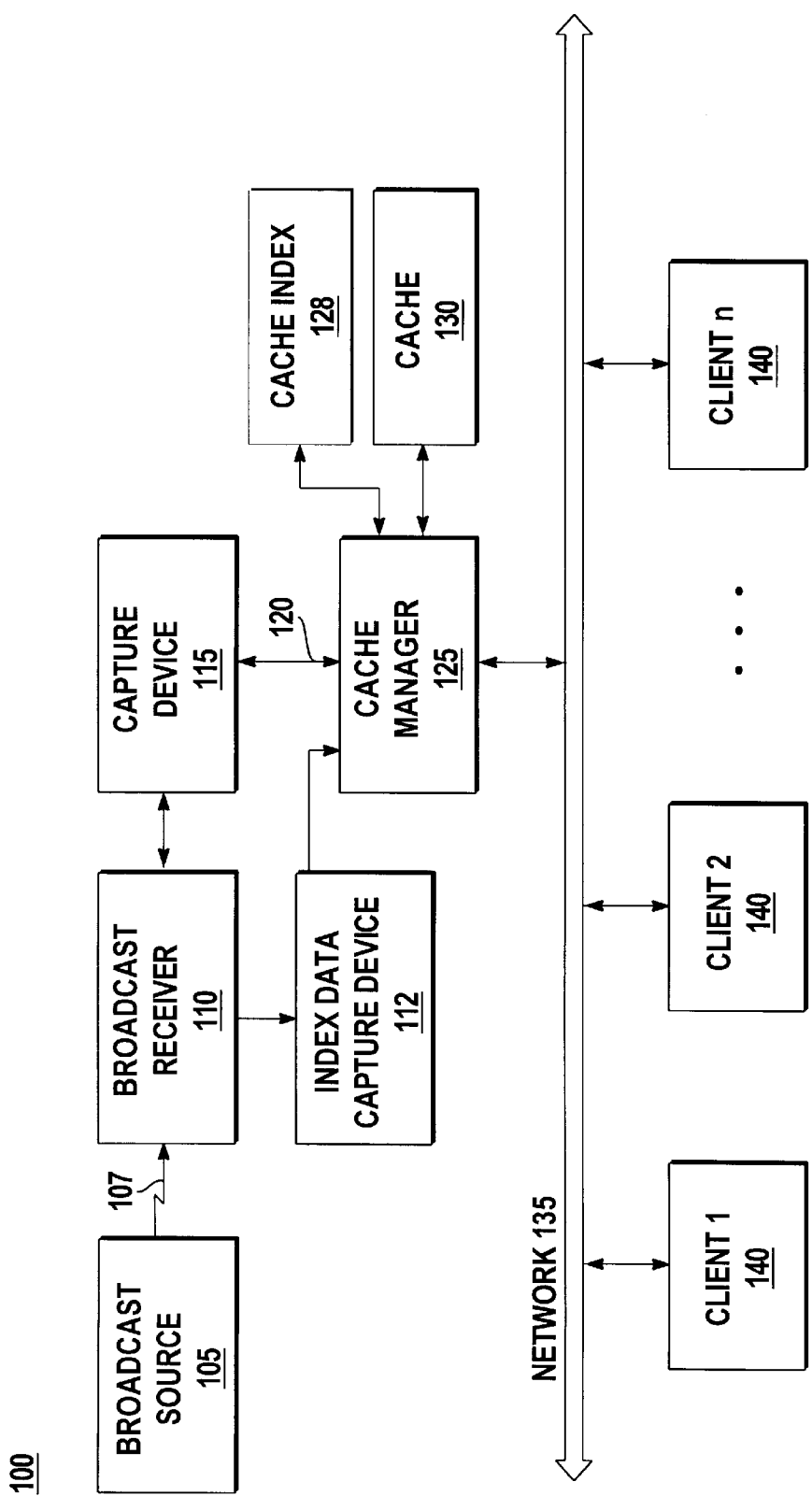
FIG. 1 shows an overview of a broadcast information transmitting, receiving and distribution system according to one embodiment of the present invention.

FIG. 1 shows an overview of a broadcast information transmitting, receiving and distribution system 100 according to one embodiment of the present invention. Broadcast information originates at broadcast source 105. Broadcast source 105 may be any of a wide variety of conventional signal broadcasting devices, such as a satellite dish, a radio or television transmitter, etc. Broadcast source 105 transmits the broadcast information over a transmission medium 107 to broadcast receiver 1 10. Transmission medium 107 represents any of a wide variety of conventional signal transmission media. For example, transmission medium 107 may be a cable, a fiber-optic cable, or may represent a nonphysical medium transmitting electromagnetic signals in the electromagnetic spectrum. Transmission medium 107 may also include any number of conventional routing or repeating devices, such as satellites or electromagnetic signal repeaters.

The broadcast information from broadcast source 105 includes both the video data and/or audio information data being presented to the end users and various control, indexing and text information. The generation and transmission of video and audio information is well-known in the art and thus will not be discussed further.

Broadcast receiver 110 receives the broadcast information transmitted by broadcast source 105 and transfers it to capture device 115 and index data capture device 112. Broadcast receiver 110 may be any of a wide variety of conventional transmission receiving devices. Receiver 110 may be included as part of a video cassette recorder (VCR), a television set, a computer system, etc. The receipt of electromagnetic signals via a transmission medium is well-known to those skilled in the art and thus will not be discussed further.

When the broadcast information is a news broadcast, the video image and/or audio data can be divided into several subject areas referred to as program segments. Each of these programming segments then includes multiple story segments. In one embodiment of the present invention, the control information transmitted by broadcast source 105 includes indexing information for each of these multiple program and story segments. In one implementation, this indexing information includes, for each of the program segments, a subject matter heading and a set of subject matter keywords which describe key aspects of the program segment. For each of the story segments, the indexing information includes: a title, the program segment the story is associated with, and a set of subject matter keywords which describe key aspects of the story segment.

In one embodiment, this indexing information is transmitted by broadcast source 105 concurrently with the video and/or audio news broadcast. The indexing information for the story segments can be generated in a wide variety manners. In one implementation, the control information is generated by an individual at the broadcast source 105. The indexing information is generated prior to transmission of the broadcast, such as by entering text into a computer system. The indexing information is then inserted into the broadcast stream when the individual indicates to do so, such as by entering the proper command to the computer system.

Alternatively, the indexing information may be generated and input into the broadcast stream automatically by the broadcast source 105. For example, news broadcasts typically use a TelePrompTer which displays the text to be read by the newscaster. This TelePrompTer can be a computer system with the text to be read by the newscaster being input to the computer system prior to broadcasting the news report. This text input into the TelePrompTer computer system includes subject matter information which can serve as the indexing information. When this subject matter information is input into the TelePrompTer, an indication is made that this text is indexing information which should be transmitted along with the video and audio broadcast. Thus, whenever subject matter information is displayed on the TelePrompTer for the newscaster to read, the indexing information is also broadcast over the transmission medium 107.

Additional methods may also be utilized to obtain the indexing information. For example, the indexing information may be generated by scanning closed caption information. Alternatively, the indexing information may be generated on the receiving end by scanning the received audio data utilizing a speech recognition process, or by scanning the received video image data information utilizing an image recognition process.

Broadcast receiver 110 transfers the received broadcast information to index data capture device 112. Index data capture device 112 obtains the information from the broadcast information and discards the remaining broadcast information. Index data capture device 112 includes the necessary hardware and software to obtain the indexing information from the broadcast information, based on the method used by broadcast source 105 to transmit the indexing information. The indexing information is then transferred to cache manager 125, along with the remainder of the broadcast information from capture device 115.

In one embodiment of the present invention, the control information, including the indexing information, is transmitted by broadcast source 105 during a vertical blanking interval (VBI). The VBI refers to the time required by the electron gun in a conventional television set (or similar video display) to reset itself to the top of the television screen from the bottom of the screen. That is, conventional video displays generate their display by using an electron gun(s) to illuminate each line on the television screen. The electron gun illuminates a single line at a time and typically starts at the top of the screen, illuminates every other line as it travels down the screen, then resets itself to the top of the screen once it reaches the bottom. During this reset from the bottom of the screen to the top of the screen, no lines of the screen are being illuminated. This period of reset is referred to as the VBI.

Typically, the VBI is equivalent to twenty-one "lines" of the display. That is, the time it takes for the electron gun to reset itself to the top of the screen from the bottom of the screen is equivalent to the amount of time it would take the electron gun to illuminate twenty-one lines on the screen. During the VBI, no video data is transmitted by a broadcasting device because the electron gun is not illuminating lines at that time. Thus, control information can be transmitted during the VBI rather than video and/or audio data without disrupting the video and/or audio transmission. The VBI is twenty-one lines under National Television Standards Committee (NTSC) and twenty-five lines under Phase Alternate Line (PAL) broadcast standards currently utilized in most North American and European countries, respectively.

Of the twenty-one lines of the VBI under NTSC, the first ten are typically used by television broadcasters for control information necessary for displaying the audio and video data. This control information includes, for example, video synchronization, luminance, and chrominance signals. In addition, some broadcasters utilize VBI line twenty-one for broadcasting the text for closed captioning for the hearing impaired. Thus, up to eleven lines of the VBI are available for transmitting the control information of the present invention. Each one of these eleven lines is capable of transferring 17,280 bits per second (bps) without error correction, or 9600 bps with forward error correction, using current VBI encoding techniques.

In one implementation of the present invention, the indexing information associated with the broadcast information is transferred over line fourteen of the VBI. It will be appreciated, however, that the indexing information can be transferred over any one or several of the available VBI lines. For example, expansion boards and devices for computer systems are commercially available which can be coupled to a conventional computer system and tuned to a particular one or several of the VBI lines, thereby allowing the computer system to receive information from the VBI.

Thus, the present invention makes use of available bandwidth (that is, the available VBI lines) in an already-existing network (that is, electromagnetic spectrum and cable transmitters and receivers). Therefore, transmitting the indexing information for the present invention does not require additional physical networks (such as cables) or additional bandwidth on already existing networks.

In an alternate embodiment of the present invention, indexing information is generated at the receiving end based on the time rather than being inserted at the transmission end. In this embodiment, index data capture device 112 and cache manager 125, discussed in more detail below, "know" the topic of a particular segment being broadcast based on the time it is broadcast. For example, a repeating news transmission may transmit sporting news for five minutes every half-hour starting at ten minutes past the half-hour. Thus, index data capture device 112 and cache manager 125 "know" that all video and audio data received during that five-minute span is sports related. Thus, a subject-matter index can be generated and provided to the individual end users without transmitting any additional indexing information.

In one implementation of this alternate embodiment, further indexing is available via the closed caption information received. That is, specific story subject headings within the subject matter heading can be generated by scanning the closed caption information. For example, the closed caption information could be scanned for all names of professional sports teams, with each of these team names being presented to the end users as a story subject heading.

Index data capture device 112 receives the broadcast information from broadcast receiver 110 and obtains the indexing information from the broadcast information. It will be appreciated that although index data capture device 112 and capture device 115 are shown as separate units in FIG. 1, both units may be part of the same physical device. The method utilized by index data capture device 112 to obtain the indexing information is dependent on the method utilized by broadcast source 105 to transmit the indexing information. For example, index data capture device 112 may receive the indexing information from one of the VBI lines, or alternatively, may utilize a video or speech recognition process or other communications link to examine the broadcast information and obtain the indexing information. Thus, for certain video and speech recognition processes, index data capture device 112 converts the broadcast information to digital form prior to performing the recognition. Upon obtaining the indexing information, index data capture device 112 transfers the indexing information to cache manager 125 and deletes the remainder of the received broadcast information.

Capture device 115 receives the broadcast information from broadcast receiver 110. It will be appreciated that although capture device 115 and broadcast receiver 110 are shown as separate units in FIG. 1, both units may be part of the same physical device. Capture device 115 operates in a conventional manner to convert video and audio data received in analog form into a digital form which can be displayed on a display device of a computer system. Broadcasts received in digital form require no such conversion. In one embodiment, capture device 115 also compresses the digital form of the video and audio data for storage. In one implementation, capture device 115 utilizes Indeo™ IRV (ISDN Rate Video) compression, available from Intel® Corporation of Santa Clara, Calif., the corporate assignee of the present invention. Utilizing Indeo™ IRV allows video and audio data to be stored in approximately 40–60 MB (megabytes) of storage space per thirty minutes of information. In addition, Indeo™ IRV provides a fifteen frames per second playback rate with a transfer rate of 300 kbps. However, any of a wide variety of compression techniques may be utilized, such as Indeo™ HQV, MPEG, JPEG, etc. It will be appreciated that the higher the bandwidth of network 135, the higher the image resolution and/or frame rate which can be made available to the end users. In one embodiment, broadcast receiver 110 and capture device 115 operate to continuously receive and capture broadcast information.

After compressing the video and audio data, capture device 115 transfers the compressed digital information to cache manager 125 via network 120. In one implementation, network 120 is a conventional 10 Mbps Ethernet network used solely by capture device 115 to transfer the compressed digital information to cache manager 125. In the embodiment shown, a single cache manager 125 is coupled to network 120. Alternatively, additional cache managers 125 may also be coupled to network 120, each of which receives the compressed data transmitted by capture device 115. Providing multiple cache managers 125 allows the capture device 115 to transfer the compressed data to cache managers 125 serving multiple local area networks (LANs).

In one implementation of the present invention, capture device 115 operates in a pipelined manner to continuously process the received broadcast information. That is, as soon as a block of data is received it is converted to digital form (if necessary), compressed, and transferred to cache manager 125. This block of data could be, for example, a single frame of a sequence of frames or a display line. The end of a story segment can be determined by receiving an end-of-segment signal from the broadcast source 105, by the receipt of new segment indexing information, by video and/or audio indications such as sudden volume changes, pauses, or by scene changes. Alternatively, capture device 115 may operate on a segment-by-segment basis to compress and transfer information. That is, information received as part of a segment from broadcast receiver 110 is stored temporarily in capture device 115 until the entire segment is received. Once the entire segment is received, the segment is converted (if necessary), compressed, and transferred to cache manager 125.

Cache manager 125 stores the compressed information received from capture device 115 in cache 130. In one implementation, cache 130 is a conventional high-speed magnetic disk drive having one gigabyte of storage space and being capable of storing at least two hours of compressed video and audio data. However, it will be appreciated that any of a wide variety of conventional mass storage devices can be utilized as cache 130. Alternatively, cache 130 may be an analog storage medium, such as a videocassette, rather than a digital storage medium. If cache 130 is an analog storage medium, then capture device 115 does not convert received analog signals to a digital form (however received digital signals may be converted to an analog form by capture device 115).

Cache manager 125 is also coupled to cache index 128 where cache manager 125 stores the indexing information, such as titles and keywords, for each program and story segment of the video and audio data stored in cache 130. Cache index 128 may be a volatile memory device, such as a random access memory, or may be a nonvolatile storage device such as a magnetic disk drive. It will be appreciated that although cache manager 125, cache index 128, and cache 130 are shown as separate units in FIG. 1, each of these units may be part of a single physical device, such as a computer system file server. In one implementation, index data capture device 112, capture device 115, cache manager 125, cache index 128, and cache 130 are part of the same computer system file server.

In one embodiment of the present invention, when a block of video and audio data is received, such as a single frame of a sequence of frames, the time of receipt is associated with the block by capture device 115. Similarly, index data capture device 112 associates the time it receives the indexing information with the indexing information itself. Thus, when the indexing information and the block of video and audio data is transferred to cache manager 125, cache manager 125 is able to correlate the indexing information with the blocks of video and audio data via the time stamps of each. Cache manager 125 continues to associate the received indexing information with subsequent blocks of video and audio data until new indexing information is received. Once a new segment of indexing information is received, an indicator of each block of video and audio data stored in cache 130 is stored with the indexing information in cache index 128, and subsequent blocks of video and audio data are associated with the new indexing information.

In addition, cache manager 125 keeps an indicator of which of the versions of a particular program or story segment is the most recent, the next most recent, etc. This indicator may be stored in cache index 128, or alternatively, in a separate local storage device of cache manager 125 (such as a random access memory). In one implementation, this indicator is updated as soon as a new version of the segment is received and stored in cache 130. Thus, when an individual end user requests a particular segment stored in cache 130, such as by the title or keywords, cache manager 125 is able to quickly retrieve the most recent version of the requested information and return it to the user.

In one embodiment of the present invention, cache manager 125 updates the indicator of a new version each time a new program segment and associated story segments are retrieved. Alternatively, cache manager 125 may update the indicator of a new version each time a new story segment is retrieved.

In one embodiment of the present invention, cache manager 125 also maintains a list of which program segments in cache 130 are currently being viewed (and/or listened to) by individual end users and a user identifier of the client system 140 which the program segment is being transferred to. Thus, cache manager 125 knows which versions of program segments are being accessed at any given time. When a user requests a particular program segment or a story segment within a particular program segment, discussed in more detail below, the cache manager 125 stores a user identifier, a program segment identifier for that particular segment, and the starting time of the access.

In one embodiment, the broadcast information transmitted by broadcast source 105 is a repeating news broadcast. For example, the broadcast 10 information may be Turner Broadcasting's CNN Headline news, which repeats four program segments every thirty minutes (e.g., Headlines, Dollars and Sense, Lifestyles, and Sports). Due to the repeating nature of such news broadcasts, it is not necessary for cache 130 to store the entire day's broadcasts. Thus, cache manager 125 removes the video and audio data stored in cache 130 for broadcasts earlier in the day.

Cache manager 125 determines which earlier broadcasts should be removed by establishing a predetermined number of broadcasts which will be kept in cache 130. In one implementation, this predetermined number of broadcasts is three (for example, the most recent ninety minutes of CNN Headline news). By storing multiple broadcasts, cache manager 125 is able to update cache 130 with the newest version of a program segment while end users are viewing older versions of the segment. For example, end user A may start watching a story segment. Before end user A completes viewing the segment, the most recent version of that segment is received by cache manager 125 from capture device 115. Thus, cache manager 125 allows end user A to finish watching the older version of the segment while storing the newer version in cache 130. Once storage of the most recent version in cache 130 is complete, subsequent end users B, C, etc. requesting that segment will be given the newer version. In one implementation, cache manager 125 overwrites one version of a program segment currently stored in cache 130 with the most recent version of that segment.

Note that previous program segments can be deleted in a wide variety of manners. In one implementation, cache manager 125 removes an indicator of the program segment from a list of indicators of segment versions associated with a particular title. Alternatively, the new version may actually overwrite the locations in the cache 130 where the older segment was stored. It should be noted that although the above description describes replacing segments in cache 130 on a program segment basis, cache manager 125 may, alternatively, replace segments in cache 130 on a story segment basis. That is, cache manager 125 operates as described above, except that cache manager 125 replaces new versions of story segments as they are received rather than waiting for the receipt of an entire program segment.

In one embodiment of the present invention, once cache manager 125 receives a request for a story or program segment from a user of client system 140, the most recent version of that segment is "reserved" for that user. That is, the most recent version of that segment at the time cache manager 125 receives the request is recorded in cache manager 125 as being viewed by this user. Thus, if the user requests five different segments, each of those five segments is reserved at the time the request is received. Alternatively, cache manager 125 may temporarily store the request for five segments, and reserve the most recent version of a requested segment only when transfer of that segment to the client system 140 actually begins.

It should be noted that certain situations could arise where all of the prior newscasts are being viewed by individuals when a new version is ready to be stored in cache 130. In one embodiment, cache manager 125 resolves this situation by automatically terminating delivery of the oldest version to any individuals viewing the oldest version. The oldest version is then overwritten by the new version, and cache manager 125 restarts transmission of the new version to the previously terminated users. Alternatively, cache manager 125 may drop the newly received segment and not store it in cache 130. Or, cache manager 125 may store the most recent version in cache 130; then, once no end users are viewing one of the older versions, that version not being viewed is deleted from cache 130.

In one embodiment, cache manager 125 continuously monitors the activity of individuals requesting information. If an individual user remains inactive for a predetermined period of time (in one implementation, ten minutes), then cache manager 125 terminates transmission of that version of the segment to that user. Cache manager 125 then provides the newest version of that segment to that user. A user may be inactive, for example, by starting to view a story segment, then pausing receipt of the story. Thus, all versions of a story segment will generally not be in use (that is, viewed) by users at any given time.

Cache manager 125 is coupled to multiple client computer systems 140 via network 135. In one embodiment, network 135 is a LAN. In one implementation, network 135 is a conventional 10 Mbps Ethernet network. When an individual user of a client system 140 desires to view the news stored in cache 130, the client system 140 transmits a request to cache manager 125. Cache manager 125 returns a listing of the story segments from cache index 128 about stories available from cache 130. Based on this listing of segments, the individual user selects those that he or she wishes to view. This may be done on a segment-by-segment basis, or may be all the story segments within a particular subject area. Client system 140 then transmits this selection to cache manager 125, which retrieves the selected segments from cache 130 and transfers the selected segments to the client system 140 via network 135. Client system 140 then decompresses the selected segments and displays them to the individual user.

In one embodiment, cache manager 125 supports periodic transmissions from cache index 128 to the client systems 140. That is, each user of a client system 140 can choose certain subject areas to be received periodically. For example, users may request that news headline titles be received every two hours. In this situation, cache manager 125 transmits the most recent headline titles contained in cache index 128 over network 135 every two hours, targeting those client systems 140 which requested the information.

It should be noted that although FIG. 1 is described in terms of multiple computer systems coupled together via one or more networks, the present invention is not limited to such a system. For example, the broadcast receiver 110, index data capture device 112, capture device 115, cache manager 125, cache index 128, and cache 130 may be included within a single physical unit. This single unit could be, for example, a set-top box coupled to a single television set in an individual user's home. The television is analogous to a client system 140, and could include a graphical user interface (GUI) or alphanumeric input device for inputting requests for story segments. Thus, broadcast information would be continuously received by the set-top box, and the most recent information would be made available to the individual user at his or her request.

The user of a client system 140 may also search for particular news titles. For example, the user may enter subject matter search terms, such as a professional sports team name, to client system 140. In one embodiment, the client system 140 transfers a request to cache manager 125 for titles of all story segments which match the search criteria. The cache manager 125 searches in a conventional manner through the title information in cache index 128, or alternatively through the keyword information, associated with the most recent story segment versions stored in cache 130. The segments for any matches are then transferred to client system 140. In an alternate embodiment, cache manager 125 transfers all of the titles and the keyword descriptions to client system 140 and client system 140 attempts to match the search criteria to the titles and/or keywords. If any matches are found, then client system 140 sends a request to cache manager 125 for the matched titles.

In one embodiment, cache manager 125 makes the titles of only the most recent story segments available to the users of client systems 140. Thus, once a new program segment is received by cache manager 125 and stored in cache 130, only story segments of the new program segment are available for subsequent requests for those titles within the new program (requests for a title which are received by cache manager 125 prior to receipt of the new program segment are given the most recent segment at the time the request is received). Note that in this embodiment, a story segment could be an hour old even if the broadcast repeats itself every thirty minutes. This situation occurs, for example, when broadcast source 105 stops broadcasting a particular story segment. In one implementation, cache manager 125 keeps the story segment available to the client systems 140 for so long as the remaining segments which were broadcast in the same thirty-minute span as that story segment are available. For example, if three versions of the thirty-minute broadcast are kept in cache 130, then once the title has been available for ninety minutes, cache manager 125 deletes it (assuming no user is currently viewing the segment).

In an alternate embodiment, cache manager 125 provides the titles of all the story segments stored in cache index 128 and cache 130 to the users of the client systems 140. Thus, in this alternate embodiment an individual user is able to view the most recent available version of a segment, the next most recent version of the segment, or the oldest version of the segment, depending on how many versions are stored in cache index 128 and cache 130.

Figure 2:
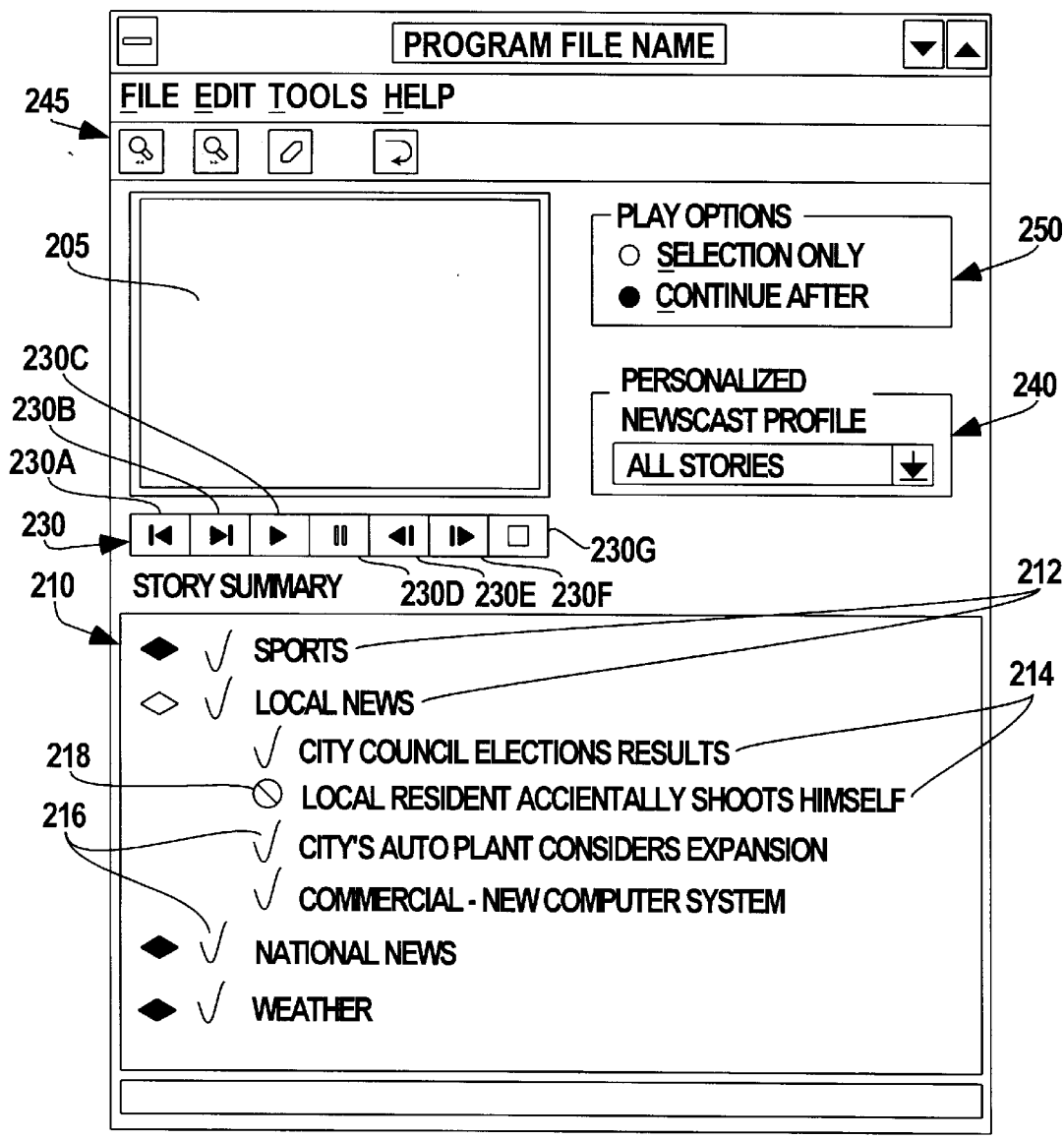
FIG. 2 shows an example user-interface of the present invention.

FIG. 2 shows an example user-interface of the present invention. Interface 200 is displayed to the individual user by client system 140 of FIG. 1. Interface 200 may be, for example, a display device coupled to the client system 140, or a television set coupled to a set-top box.

Interface 200 includes an information display area 205, an index display 210, a storage interface 230, and a personalized newscast profile 240. Information display area 205 presents the video data stored in cache 130 of FIG. 1 to the individual user. Index display 210 provides multiple subject matter headings 212 of program segments to the individual user from cache index 128. Under each of the subject matter headings 212 may also be displayed story segment titles 214. In one implementation, the individual user can toggle between displaying segment titles 214 and not displaying segment titles 214 by double-clicking a cursor control device on a subject matter heading 212 (such as a double-clicking a mouse when the mouse pointer is on a heading 212). The individual user is able to select those areas which are of interest to him or her by either selecting an entire subject matter heading 212, or by selecting separate story segment titles 214. The individual user can toggle between selecting a segment title and not selecting a title by single-clicking a screen pointer on a story segment title 214. In one implementation, headings or segments which an individual selects to view are indicated by a check mark 216, and headings or segments which an individual does not want to view are indicated by a circle with a line through it 218. In one embodiment, the individual user is able to alter the order in which the news information is presented via information display area 205 by re-ordering the selected headings and segments. This can be done, for example, by "dragging and dropping" titles in a conventional manner to re-arrange the order.

Storage interface 230 provides the individual user with the ability to control receipt of the selected headings and segments. Once an individual user has selected the headings and/or segments which he or she wishes to view, storage interface 230 allows the user to control receipt of those stories. In one embodiment, storage interface 230 is displayed analogous to the keys on an audio compact disc player. In this embodiment, the options are: return to previous story or beginning of current story 230a, jump to next story 230b, play 230c, pause 230d, scanning rewind 230e, scanning fast forward 230f, and stop 230g. Thus, once an end user selects the stories he or she wishes to watch, the receipt of the stories can be paused, fast forwarded, repeated, etc. Thus, individual users are able to select only those stories they think will be of interest to them, and then jump over certain stories if they are not of interest, or repeat them if they are especially interesting.

Personalized newscast profile 240 provides the individual user with the ability to automatically select or re-order the display of certain subject matter headings or story segments. Personalized newscast profile 240 is coupled to a personal profile for an individual user of a client system 140 of FIG. 1. In one implementation, this personal profile is stored in a storage device of client system 140. Personalized newscast profile 240 indicates which story segments are to be made available via index display 210. In one embodiment, personalized newscast profile 240 allows the user to select "All Stories" (as shown), where all titles are available for display in index display 210. Alternatively, the user could select a subject matter-only option, such as "Headlines Only", to indicate that only titles associated with that subject matter heading should be displayed, or a "Personal Profile" option to indicate that only titles associated with subjects indicated in the personal profile (for example, sports) should be displayed.

In addition, the personalized newscast profile 240 can also be utilized to re-order the subject areas. For example, the personal profile may indicate that an individual user prefers to view sports news prior to headline news. Thus, all sporting titles are displayed to that user before headline news titles are displayed.

In one embodiment, the personal profile is constantly being monitored and updated by client system 140. That is, client system 140 stores a record of the selections made by the individual user. These stored selections can then be compared after a sufficient number have been generated to determine the preferences of the individual. For example, an individual may always select to view sports titles prior to viewing headline news titles. Thus, client system 140 can automatically save an indication that this user prefers to view sports first. Similarly, an individual may consistently choose to read headline news segments which have a particular set of keywords associated with them (for example, peace talks between two particular countries). Thus, client system 140 can place titles of story segments associated with these keywords first in a list displayed to the individual user.

In addition, client system 140 may also utilize the personal profile to remove articles from being displayed to the individual user. For example, a particular user may never select to read sporting news regarding baseball, regardless of how frequently those titles are presented to the user. After a sufficient number of baseball titles have been bypassed by the user, client system 140 simply stops presenting the titles to the user. Note, however, that the user would still have access to those titles, if desired, by selecting the "All Stories" option of the personalized newscast profile 240.

In one embodiment, the user of a client system 140 is also provided with an interface, such as a GUI, which allows the user to alter his or her own personal profile. Thus, the user is able to override any subject matter re-ordering modifications or story segment deletions stored in his or her personal profile by the client system 140.

In one embodiment of the present invention, interface 200 also includes search tools 245 and play options 250. Search tools 245 provide an interface for the end user to search for particular story segments based on a list of entered keywords, as discussed above. Play options 250 provide the user with the ability to select how multiple story segments selected in index display 210 are to be viewed in display area 205. For example, the user may be provided with the choices "Selection Only" and "Continue After". If "Selection Only" is chosen, each selected segment is displayed and the subsequent selected segment is not display until the user activates the play 230c. If "Continue After" is selected, then each of the selected segments are displayed back to back. The options provided by play options 250 are particularly useful when the user selects multiple story segments to be displayed rather than a single story segment.

Figure 3:
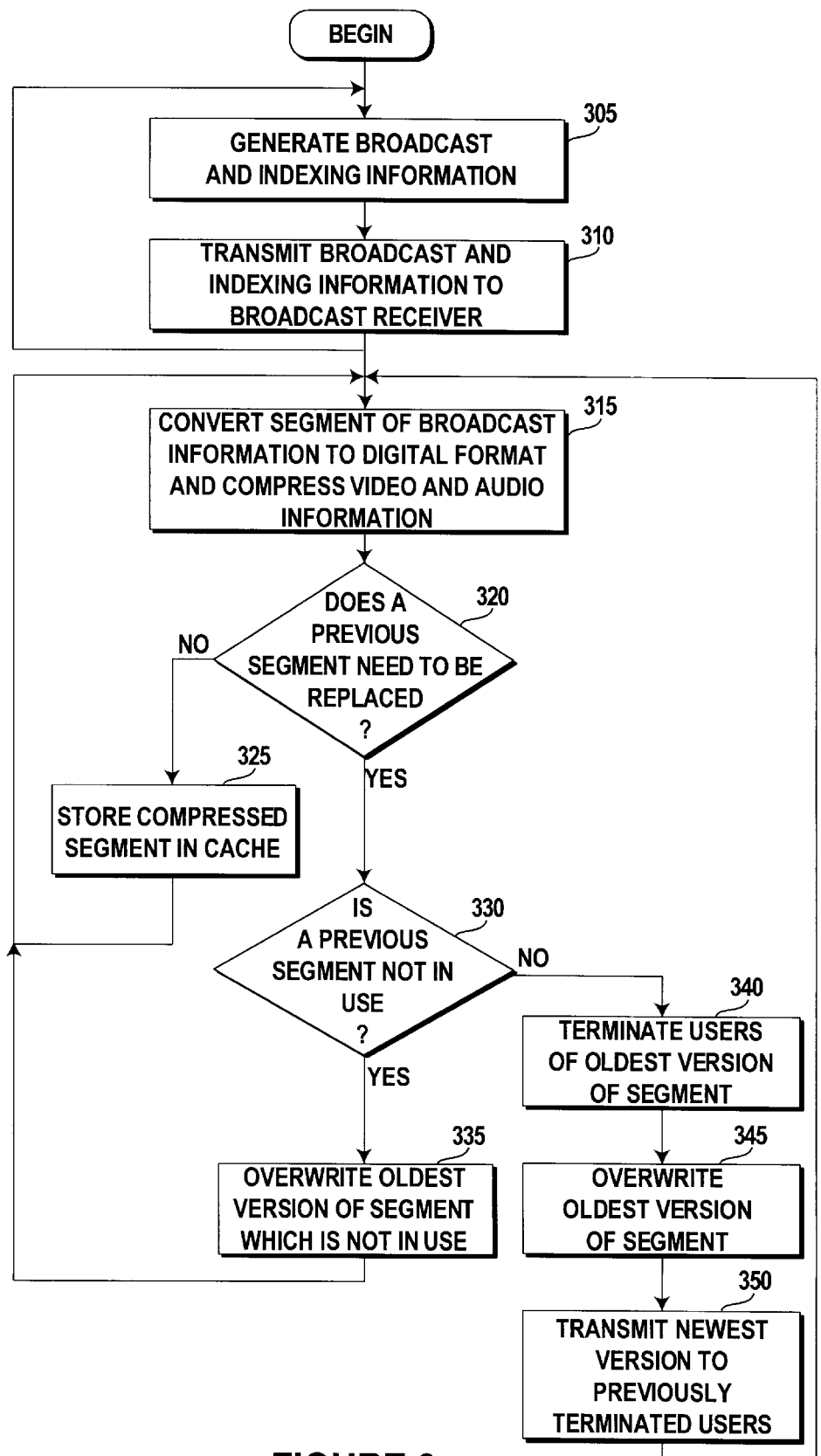
FIG. 3 is a flowchart showing the steps followed in maintaining current story segments in one embodiment of the present invention.

FIG. 3 is a flowchart showing the steps followed in maintaining current story segments in one embodiment of the present invention. Broadcast information and indexing information associated with the broadcast information is initially generated, step 305. The broadcast information includes video image data, audio data, and any other necessary control information. Once the broadcast and indexing information is generated, a broadcast device transmits the broadcast and indexing information to a broadcast receiver, step 310. Steps 305 and 310 are a continuous process, with new story segments being continuously broadcast.

Once a story segment of broadcast information has been received, the data is converted to digital form (if necessary) and the video and audio data is compressed, step 315. The conversion and compression of step 315 may be performed by a capture device which the broadcast receiver transmits the broadcast information to, or, alternatively, may be performed by the broadcast receiver itself. In one implementation, this information is compressed on a frame by frame basis, where a frame refers to a single static screen display. Concurrent with the compression in step 315, an index data capture device obtains the indexing information from the broadcast information and associates the indexing information with the video and/or audio data.

The cache manager continues to receive story segments until an entire program segment is received. Once an entire program segment is received, the cache manager determines whether a previous program segment stored in the cache needs to be replaced, step 320. If a program segment does not need to be replaced, then the cache manager stores the compressed program segment information in the cache, step 325. Typically, a previous program segment will not need replacing only shortly after the cache is initiated (and thus has stored very little information so far), or when a new program segment is being transmitted by the broadcast source. The cache manager then returns to step 315 to continue processing newly received program segments.

Note that in one embodiment, the cache manager receives the compressed information from the capture device which compressed the information and transfers it to storage in a cache. The capture device continuously transfers the received information to the cache manager, thereby placing the burden on the cache manager to determine when a program segment is completely received. Alternatively, the capture device may determine when a program segment is completely received.

Returning to step 320, if a previous program segment does need to be replaced, then the cache manager checks whether a previous version of the program segment is not in use, step 330. A version of a program segment is in use if an individual user is viewing the segment, or has paused viewing the segment and not timed out yet. If a previous program segment is not in use, then the cache manager overwrites the oldest version of the program segment which is not in use, step 335. The cache manager then continues processing newly received program segments in step 315. If, however, all previous program segments are in use (that is, no segments are not in use), then the cache manager terminates delivery of the oldest version of the program segment to any individuals viewing the oldest version, step 340. The cache manager then overwrites the oldest version of the program segment with the new version, step 345. Then, in step 350, the cache manager begins transmission of the new version of the program segment (or selected story segments within the program segment) to any of the users which were terminated in step 340. The cache manager then continues processing newly received program segments in step 315.

In an alternate embodiment of the present invention, the steps of FIG. 3 are followed to replace story segments rather than program segments. That is, rather than replacing entire program segments at the same time, the individual story segments within the program segments are replaced as new versions of the story segments are received.

Figure 4:
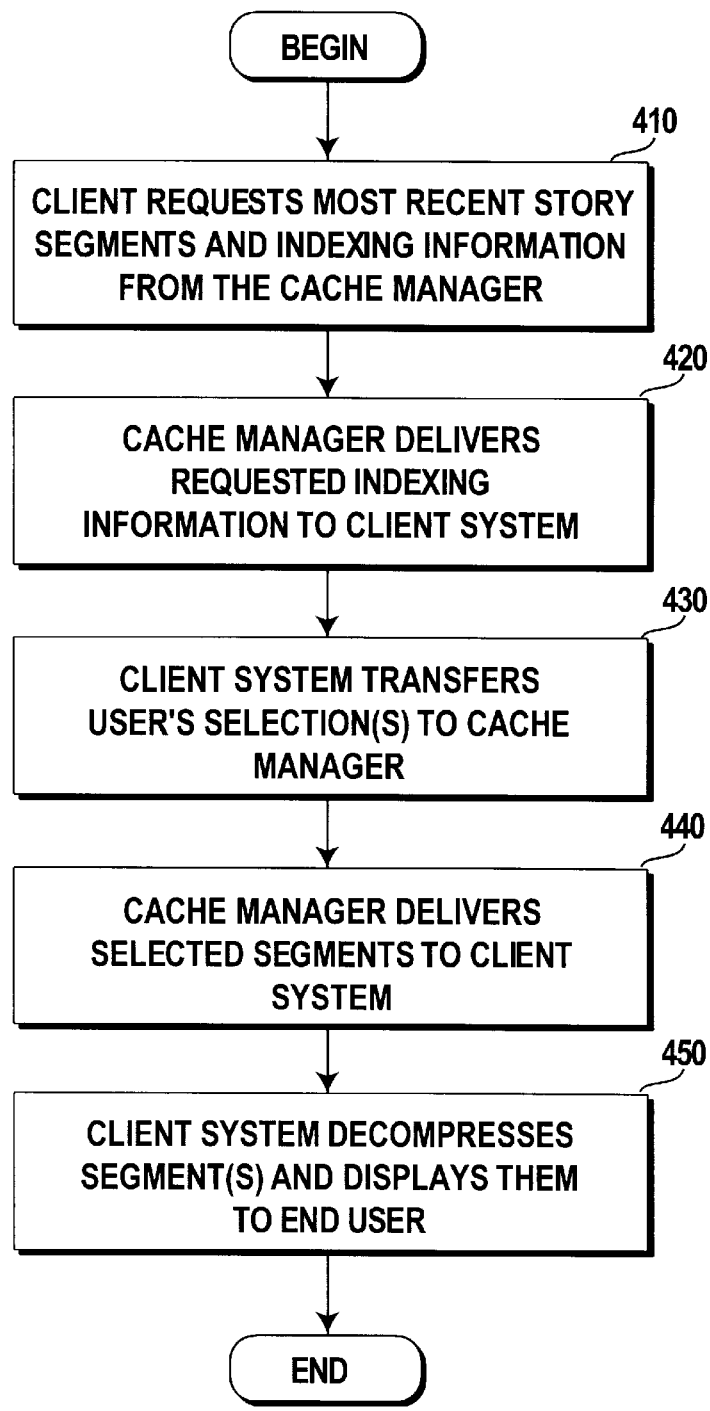
FIG. 4 is a flowchart showing the steps followed in providing broadcast information to individual users in one embodiment of the present invention.

FIG. 4 is a flowchart showing the steps followed in providing broadcast information to individual users in one embodiment of the present invention. A client system initially requests the most recent story segments and indexing information from the cache manager, step 410. The cache manager then delivers the requested indexing information to the client system, step 420. In one embodiment, this indexing information includes multiple program segment headings and multiple story segment titles listed below each program segment heading. Individual users are able to select which of these titles they would like to receive the entire story for, and the client system transfers these selections to the cache manager, step 430. The cache manager then delivers the requested segment(s) in the cache to the requesting client system(s), step 440. The client system(s) then decompress the requested segments and display them to the requesting user(s), step 450.

Figure 5:
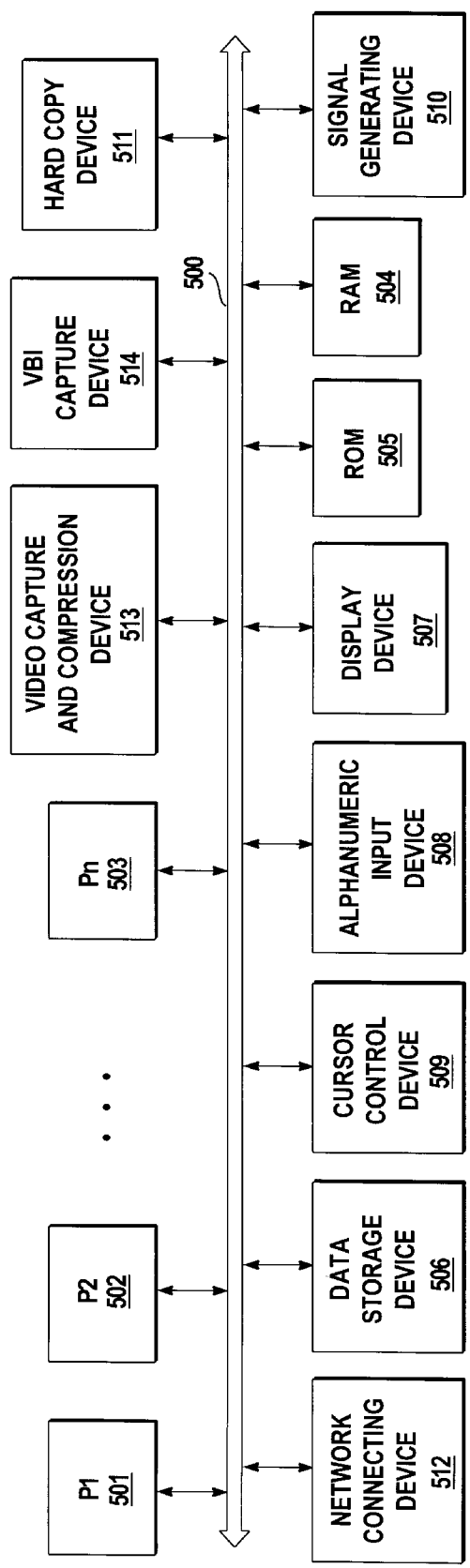
FIG. 5 shows an overview of an example multiple-processor computer system which can be utilized in the present invention.

FIG. 5 shows an overview of an example multiple-processor computer system which can be utilized in the present invention. This computer system may be broadcast receiver 110, capture device 115, cache manager 125, cache 130 or a client system 140 of FIG. 1. Alternatively, the computer system of FIG. 5 may be a combination of these devices, such as broadcast receiver 110, capture device 115, network 120, cache manager 125, and cache 130 of FIG. 1.

The computer system generally comprises a bus or other communication device 500 for communicating information between one or more processors 501, 502, and 503 for processing information and instructions. In one implementation, the present invention includes Intel® architecture microprocessors as processors 501–503; however, the present invention may utilize any type of microprocessor architecture. In one embodiment, bus 500 includes address, data and control buses. The system also includes random access memory (RAM) 504 coupled with bus 500 for storing information and instructions for the processors 501–503, a read only memory (ROM) 505 coupled with the bus 500 for storing static information and instructions for the processors 501–503, a data storage device 506 such as a magnetic disk and disk drive coupled with the bus 500 for storing information and instructions, a display device 507 coupled to the bus 500 for displaying information to the computer user, an alphanumeric input device 508 including alphanumeric and function keys coupled to the bus 500 for communicating information and command selections to the processors 501–503, a cursor control device 509 coupled to the bus for communicating user input information and command selections to the processors 501–503, and a signal generating device 510 coupled to the bus 500 for communicating command selections to the processors 501–503.

A hard copy device 511, such as a plotter or printer, is also coupled to the bus 500 for providing a visual representation of the computer images, and a network connecting device 512 is coupled with the bus 500 for allowing the system to communicate with other computer systems over a larger network of computer systems, such as a local area network (LAN). In one embodiment, network connecting device 512 provides access to multiple networks.

A video capture and compression device 513 is also coupled to the bus 500 for receiving and compressing broadcast information. A VBI capture device 514 is also coupled to the bus 500 for receiving information from one or several VBI lines.

The display device 507 utilized with the computer system and the present invention may be a liquid crystal device, cathode ray tube, or other display device suitable for creating graphic images and alphanumeric characters (and ideographic character sets) recognizable to the user. The cursor control device 509 allows the computer user to dynamically signal the two dimensional movement of a visible symbol (pointer) on a display screen of the display device 507. Many implementations of the cursor control device are known in the art including a trackball, trackpad, mouse, joystick or special keys on the alphanumeric input device 508 capable of signaling movement of a given direction or manner of displacement. It is to be appreciated that the cursor may also be directed and/or activated via input from the keyboard using special keys and key sequence commands. Alternatively, the cursor may be directed and/or activated via input from a number of specially adapted cursor directing devices, including those uniquely developed for the disabled.

Certain implementations of the present invention may include additional processors or other components, such as motion video or VBI hardware. Furthermore, certain implementations of the present invention may not require nor include all of the above components. For example, processor 502, display device 507, or mass storage device 506 may not be coupled to bus 500.

In one embodiment of the present invention, information is made available to individual users from broadcast source 105 in addition to the video and audio broadcast information being transmitted. This additional information is transmitted on one of the available VBI lines. This additional information could be displayed to end users periodically or on request. For example, one type of information which could be made available is a real-time stock monitor. By way of another example, current weather reports could be transmitted, even if they are not part of the normal news broadcast. Alternatively, text associated with the video and audio broadcast may be transmitted by broadcast source 105, such as background information relating to a particular news story.

In one embodiment of the present invention, capture device 115 of FIG. 1 is coupled to multiple broadcast receivers 110. Each of the broadcast receivers 110 is tuned to a different frequency, thereby enabling each receiver 110 to receive signals from a different broadcast source 105. Thus, capture device 115 transfers information received from multiple sources to cache manager 125, which stores the information in cache 130.

It will be appreciated that information other than news reports can be transmitted to individual end users via system 100 of FIG. 1. For example, soap operas could be made available to the individual users. This could be accomplished in the manner described above, wherein the broadcast source 105 of FIG. 1 transmits indexing information along with the video and audio data. These segments could be story-line and character-name indexed. Alternatively, the capture device 115 of FIG. 1 could generate the necessary indexing information based on received closed captioning material. For example, each segment could be indexed by the particular characters interacting in the video and audio broadcast at that time. Thus, individual users can select the story lines they wish to watch based on the characters which are interacting in those story lines. By way of another example, hosted talk shows could be made available to the individual users. These talk shows could be indexed similar to the soap opera example, such as by show topics or guests.

Thus, the present invention provides a method and apparatus which receives a continuous stream of broadcast information and stores only the most recent version(s) of that information. Individual users are then able to access the stored information and view the most recent version of only those portions of the information which are of interest to them based on indexing information provided to the users. Furthermore, individual users are able to view the information in whatever order they choose, regardless of the order in which the information was transmitted.

Whereas many alterations and modifications of the present invention will be comprehended by a person skilled in the art after having read the foregoing description, it is to be understood that the particular embodiments shown and described by way of illustration are in no way intended to be considered limiting. Therefore, references to details of particular embodiments are not intended to limit the scope of the claims, which in themselves recite only those features regarded as essential to the invention.

Thus, a method and apparatus for providing broadcast information with indexing has been described.

What is claimed is:

1. A method for playing broadcast information comprising:

receiving broadcast information including an audio program;

storing at least one part of the audio program in a storage device;

displaying a set of indexing information associated with different portions of the at least one part of the audio program which can be retrieved for playing;

retrieving at least one of the different portions of the at least one part of the audio program from the storage device based on at least a selected portion of the set of indexing information; and playing the at least one of the different portions of the audio program.

2. The method of claim 1, wherein the storing comprises:

determining whether a first part of the audio program is a more recent version of a second part of the audio program, wherein the second part was previously stored in the storage device; and deleting the second part from the storage device, provided the first part is the more recent version.

3. The method of claim 2, further comprising:

determining whether an end user is currently accessing the second part; and deleting the second part from the storage device, provided the end user is not currently accessing the second part, otherwise deleting the second part from the storage device when the end user completes accessing the second part.

4. The method of claim 2, wherein the deleting comprises overwriting the second part with the first part.

5. The method of claim 1, wherein the broadcast information comprises a repeating news broadcast.

6. The method of claim 1, wherein the receiving further comprises receiving a set of text information associated with a first portion of the at least one part of the audio program.

7. The method of claim 6, further comprising providing the set of text information to an end user.

8. The method of claim 1, wherein the receiving further comprises receiving a set of graphical images associated with a first portion of the at least one part of the audio program.

9. The method of claim 8, further comprising displaying the set of graphical images.

10. The method of claim 1, wherein the displaying comprises displaying the set of indexing information associated with a most recent audio program.

11. The method of claim 1, further comprising providing a plurality of portions of the at least one part of the audio program based on a selected subset of the set of indexing information.

12. The method of claim 1, wherein the displaying comprises displaying the set of indexing information in an order which is predetermined by a personal profile.

13. The method of claim 1, wherein the receiving comprises receiving the set of indexing information during a vertical blanking interval (VBI) associated with the broadcast information.

14. The method of claim 1, further comprising:
receiving closed caption information as part of the broadcast information; and
generating the set of indexing information from the closed caption information.

15. A computer-readable medium having stored thereon a plurality of instructions, the plurality of instructions including instructions which, when executed by a processor, cause the processor to perform the steps of:
(a) receiving broadcast information including video image data;
(b) storing at least one part of the video image data in a storage device;
(c) displaying a set of indexing information associated with the at least one part of the video image data;
(d) retrieving at least one portion of the at least one part of the video image data from the storage device based on the set of indexing information; and
(e) displaying the at least one portion of the video image data.

16. The computer-readable medium of claim 15, wherein step (d) comprises the step of retrieving the at least one portion of the video image data from the storage device based on selected indexing information, wherein the selected indexing information is part of the set of indexing information.

17. The computer-readable medium of claim 15, wherein step (b) comprises the steps of:
determining whether a first part of the video image data is a more recent version of a second part of the video image data, wherein the second part was previously stored in the storage device; and
deleting the second part from the storage device, provided the first part is the more recent version.

18. The computer-readable medium of claim 17, the plurality of instructions including instructions which, when executed by the processor, further cause the processor to perform the steps of:
determining whether an end user is currently viewing the second part; and
deleting the second part from the storage device, provided the end user is not currently viewing the second part, otherwise deleting the second part from the storage device when the end user completes viewing the second part.

19. The computer-readable medium of claim 17, wherein the deleting comprises overwriting the second part with the first part.

20. The computer-readable medium of claim 15, wherein the broadcast information comprises a repeating news broadcast.

21. The computer-readable medium of claim 15, wherein step (a) further comprises receiving a set of text information associated with a first portion of the at least one part of the video image data.

22. The computer-readable medium of claim 21, the plurality of instructions including instructions which, when executed by the processor, further cause the processor to perform the step of displaying the set of text information, provided the first portion is displayed.

23. The computer-readable medium of claim 15, wherein the receiving step (a) further comprises receiving a set of graphical images associated with a first portion of the at least one part of the video image data.

24. The computer-readable medium of claim 23, the plurality of instructions including instructions which, when executed by the processor, further cause the processor to perform the step of displaying the set of graphical images, provided the first portion is displayed.

25. A computer-readable medium having stored thereon a plurality of instructions, the plurality of instructions including instructions which, when executed by a processor, cause the processor to perform the steps of:
(a) receiving broadcast information including an audio program;
(b) storing at least one part of the audio program in a storage device;
(c) displaying a set of indexing information associated with different portions of the at least one part of the audio program which can be retrieved for playing;
(d) retrieving at least one of the different portions of the at least one part of the audio data from the storage device based on at least a selected portion of the set of indexing information; and
(e) playing the at least one of the different portions of the audio program.

26. The computer-readable medium of claim 25, wherein step (b) comprises the steps of:
determining whether a first part of the audio program is a more recent version of a second part of the audio program, wherein the second part was previously stored in the storage device; and
deleting the second part from the storage device, provided the first part is the more recent version.

27. The computer-readable medium of claim 26, the plurality of instructions including instructions which, when executed by the processor, further cause the processor to perform the steps of:
determining whether an end user is currently accessing the second part; and
deleting the second part from the storage device, provided the end user is not currently accessing the second part, otherwise deleting the second part from the storage device when the end user completes accessing the second part.

28. The computer-readable medium of claim 26, wherein the deleting comprises overwriting the second part with the first part.

29. The computer-readable medium of claim 25, wherein the broadcast information comprises a repeating news broadcast.

30. The computer-readable medium of claim 25, wherein step (a) comprises receiving a set of text information associated with a first portion of the at least one part of the audio program.

31. The computer-readable medium of claim 30, the plurality of instructions including instructions which, when executed by the processor, further cause the processor to perform the step of providing the set of text information to an end user.

32. The computer-readable medium of claim 25, wherein step (a) further comprises receiving a set of graphical images associated with a first portion of the at least one part of the audio program.

33. The computer-readable medium of claim 32, the plurality of instructions including instructions which, when executed by the processor, further cause the processor to perform the step of displaying the set of graphical images.

34. The computer-readable medium of claim 25, wherein step (c) comprises providing the set of indexing information associated with a most recent audio program.

35. The computer-readable medium of claim 25, wherein step (c) comprises providing the set of indexing information in an order which is predetermined by a personal profile.

36. The computer-readable medium of claim 25, wherein step (a) comprises receiving the set of indexing information during a vertical blanking interval (VBI) associated with the broadcast information.

37. The computer-readable medium of claim 25, the plurality of instructions including instructions which, when executed by the processor, further cause the processor to perform the steps of:

receiving closed caption information as part of the broadcast information; and generating the set of indexing information from the closed caption information.

38. An apparatus comprising:

a receiving unit to receive broadcast information which includes an audio program;

a transmitting unit to transmit indexing information associated with the broadcast information to a playback device; and a processing unit to store at least one part of the audio program in a storage device and determine whether a first part of the at least one part of the audio program is a more recent version of a second part of the at least one part of the audio program already stored in the storage device, and wherein the processing unit is operative to overwrite the second part in the storage device with the first part, provided the first part is the more recent version.

39. The apparatus of claim 38, wherein the processing unit is also operative to determine whether an end user is currently accessing the second part, and overwrite the second part in the storage device with the first part if the end user is not currently accessing the second part, and otherwise delete the first part from the storage device.

40. The apparatus of claim 38, wherein the processing unit is also operative to compress the at least one part of the audio program prior to storing the at least one part of the audio program in the storage device.

41. The apparatus of claim 38, further comprising a capturing unit to digitize and compress the at least one part of the audio program.

42. An apparatus for playing broadcast information, the apparatus comprising:

means for receiving broadcast information including an audio program;

means for storing at least one part of the audio program;

means for displaying a set of indexing information associated with different portions of the at least one part of the audio program which can be retrieved for playing;

means for retrieving at least one of the different portions of the at least one part of the audio data from the means for storing based on at least a selected portion of the set of indexing information; and means for playing the at least one portion of the audio data.

43. The apparatus of claim 42, further comprising:

means for determining whether a first part of the audio program is a more recent version of a second part of the audio program, wherein the second part was previously stored by the means for storing; and means for deleting the second part from the means for storing, provided the first part is the more recent version.

44. The apparatus of claim 42, wherein the means for providing includes means for providing the set of indexing information associated with a most recent audio program.

45. The apparatus of claim 42, wherein the means for providing includes means for providing the set of indexing information in an order which is predetermined by a personal profile.

46. A method for displaying broadcast information comprising the steps of:

(a) receiving broadcast information including video image data;

(b) storing at least one part of the video image data in a storage device;

(c) displaying a set of indexing information associated with the at least one part of the video image data;

(d) retrieving at least one portion of the at least one part of the video image data from the storage device based on the set of indexing information; and (e) displaying the at least one portion of the video image data.

* * * * *